Feb. 28, 1939.                H. G. MARION ET AL                2,149,025
                           LINOLEUM CUTTING MACHINE
                             Filed Nov. 11, 1937           2 Sheets-Sheet 1
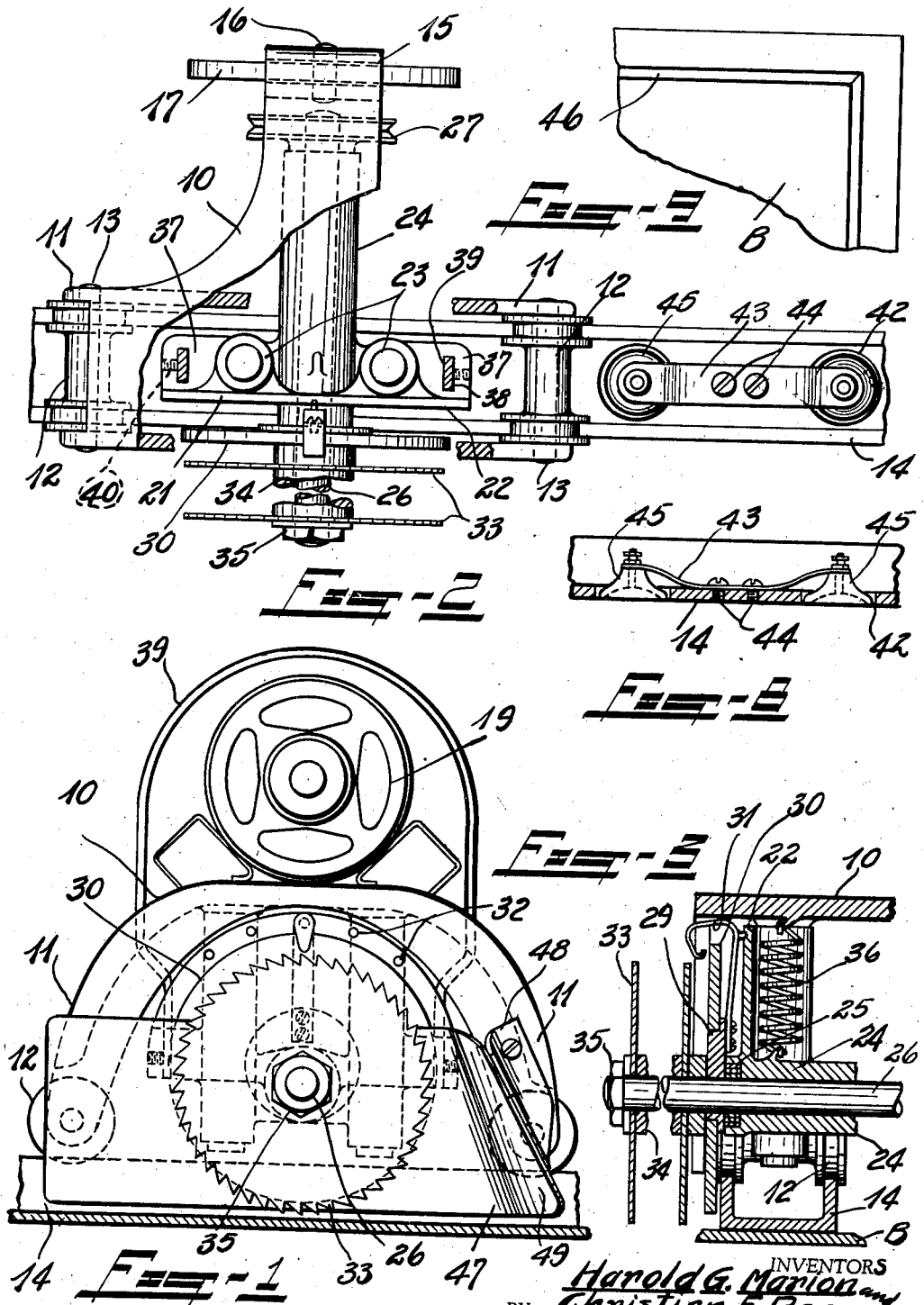
INVENTORS
Harold G. Marion and
Christian F. Reen
Frank E. Karman
BY
ATTORNEY.

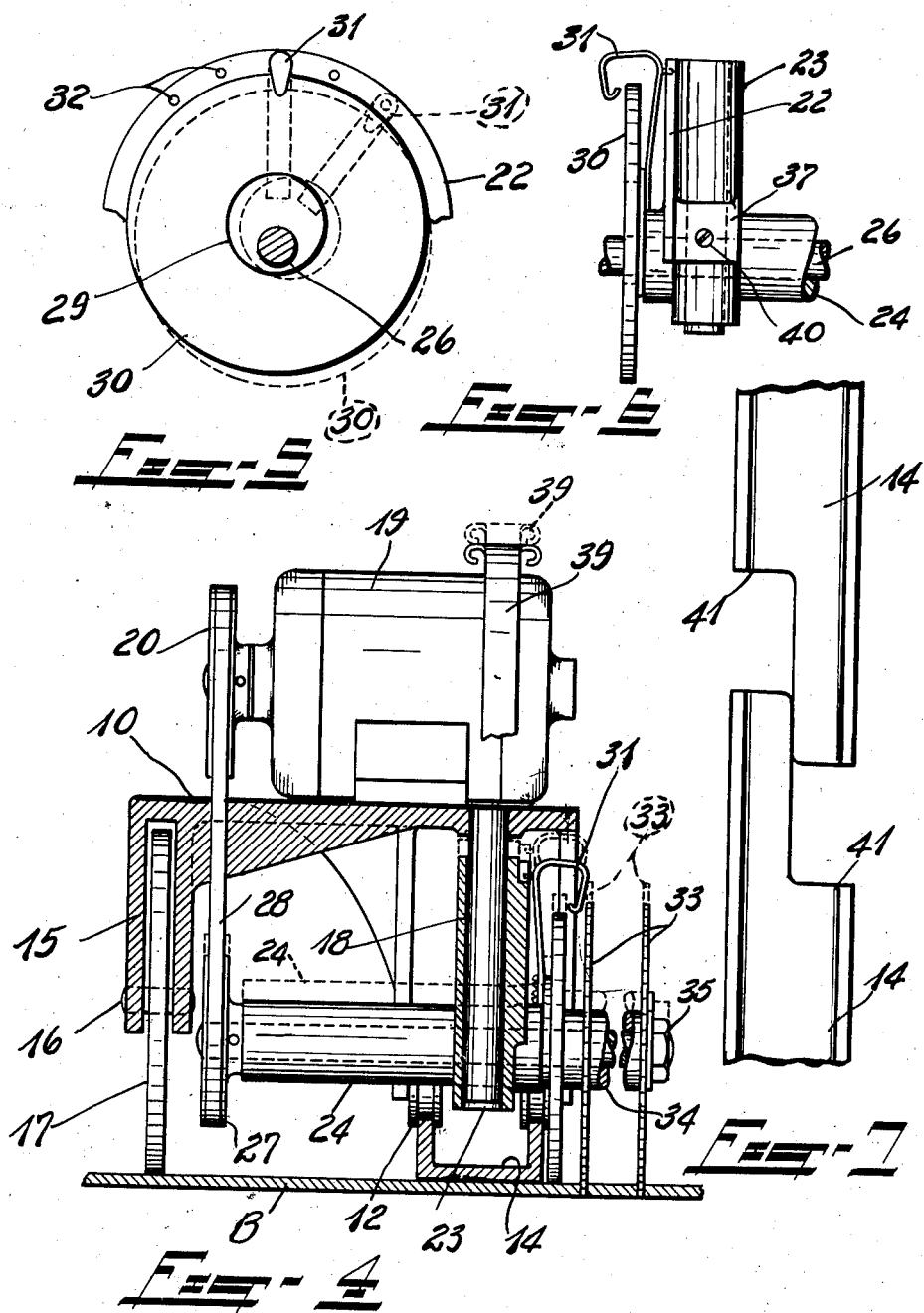

Patented Feb. 28, 1939

2,149,025

UNITED STATES PATENT OFFICE 2,149,025

LINOLEUM CUTTING MACHINE

Harold G. Marion and Christian F. Reer,
Bay City, Mich.

Application November 11, 1937, Serial No. 174,017

13 Claims. (Cl. 164—76)

This invention relates to cutting machines, and more particularly to a portable linoleum cutting machine for cutting the linoleum to suit the requirements of the room or space in which it is laid.

One of the prime objects of the invention is to design a portable cutting machine which can be easily set up and operated for cutting relatively narrow strips from the body of the linoleum, so that a narrow strip of different color and/or texture may be inserted, thus providing what is commercially known as a "feature strip".

Another object of the invention is to provide a cutting machine which is light in weight, which is simple and easy to operate, and by means of which a straight, true cut can be made for any purpose desired.

A further object is to provide a portable cutting machine which is capable of minute adjustment, so that it readily cuts to the depth required, and automatically adjusts itself to irregularities in the surface of the floor, and on which one or more cutting elements can be adjusted to cut strips of any desired thickness or width.

A further object still is to provide a sectional track and means for securing said track in set position, so that the cuts will be accurate and true.

A still further object is to design a light, portable machine which can be utilized for any purpose such as cutting strips from the body or edges of sheet material such as linoleum, wall board and similar material.

With the above and other objects in view, the present invention consists in the combination and arrangement of parts, hereinafter more fully described, illustrated in the accompanying drawings, and more particularly pointed out in the appended claims, it being understood that changes may be made in the form, size, proportions, and minor details of construction, without departing from the spirit, or sacrificing any of the advantages of the invention.

In the drawings:

Fig. 1 is a side elevational view of our cutting machine.

Fig. 2 is a part sectional plan view thereof, the motor being omitted and parts of the main frame being broken away to show the sub-frame, etc.

Fig. 3 is a fragmentary sectional end view with the motor omitted.

Fig. 4 is a sectional end view, the solid lines showing the machine in cutting position, the broken lines showing the sub-frame in raised position.

Fig. 5 is an enlarged detail showing the eccentric, the broken lines illustrating the manner of adjusting.

Fig. 6 is an edge view thereof.

Fig 7 is a plan showing the sectional track.

Fig. 8 is a fragmentary sectional side elevation of the track securing means.

Fig. 9 is a fragmentary view showing linoleum laid with a feature strip inserted.

Linoleum is manufactured in a wide variety of designs and patterns, and in the majority of installations feature strips, borders, and/or inserts are also provided for decorative purposes; the material is also made in various weights and thicknesses, and in adding the feature strips, borders, etc., it is necessary to accurately cut the edges of both the main body of material as well as the border and/or strip material in order that a smooth, tight fitting joint is provided.

Where feature strips are desired, a strip of predetermined width must be cut from the main body of material and a strip of material of different color or texture inserted therein, this cutting must be accurate and true and the edges must be clean and sharp, so that an uninterrupted, smooth surface is secured. Heretofore, this cutting has been done by hand on the job, and as feature strips and borders are laid close to walls, etc., the workmen must work in cramped, unnatural positions, making for a slow and tedious operation. Further, linoleum is of relatively stiff, heavy and solid texture, the cutting knife wedges, and it is very difficult, and in fact almost impossible to cut an absolutely true, straight line, the knife slips, mars, and scars the face of the linoleum, and the operation is tedious and unsatisfactory. All of these disadvantages we have overcome in our cutting machine, which is power actuated, and which is readily portable from job to job.

Referring now to the drawings, the numeral 10 designates the main frame of the machine which is preferably in the form of a casting, and which is formed with outwardly and downwardly projecting leg portions 11 having double grooved rollers 12 journaled thereon by means of pins 13 as usual, these rollers riding on the legs of the channel shaped, portable track 14, all as will be hereinafter more fully described. A laterally projecting, forked leg 15 is also formed integral with this casting and a pin 16 is mounted therein, a floor engaging wheel 17 being journaled on said pin as usual.

Spaced apart, vertically disposed pins or guides 18 are formed integral with or are secured to the main frame and depend from the bottom face thereof, and a motor 19 is mounted on said frame and is connected, by means of a flexible cord, (not shown) to any convenient source of power, said motor having a drive pulley 20 as usual.

A sub-frame 21 is mounted below the main frame and is vertically movable with relation thereto, said frame comprising a vertical wall 22 formed with spaced apart vertically disposed openings 23 adapted to register with and slidably receive the pins or guides 18 which form a part of the main frame, a horizontal, laterally disposed, elongated hub 24 also formed integral with the sub-frame, the ends of said sub-frame being bored to accommodate bearings 25 as usual, a shaft 26 being journaled in said bearings and a pulley 27 is mounted on one end of said shaft, a drive belt 28 serving to drivingly connect the pulley 27 to the drive pulley 20 for driving the shaft 26.

An adjustable eccentric member 29 is also mounted on the shaft 26, and a wheel 30 is mounted on said eccentric, said wheel engaging the face of the linoleum when the machine is in operation. An adjusting lever 31 is provided on the eccentric 29 and is rotatably shiftable to adjust said eccentric, and consequently the wheel which is mounted thereon; a suitable lug is being provided on the lever 31, and seats in one of the openings 32 provided in the face of the sub-frame. The shaft 26 projects beyond the face of the eccentric, and spaced apart cutting saws 33 are mounted thereon, separators 34 being provided on the shaft to properly space the saws, and the end of the shaft is threaded to accommodate a nut 35 as usual.

The sub-frame 21 is vertically movable with relation to the main frame, and a spring 36 is anchored to the main frame and sub-frame respectively, said spring normally serving to pull the sub-frame upwardly against the main frame, and thus hold the cutting members in raised position.

Bosses 37 are provided on opposite ends of the sub-frame, and are formed with openings 38 adapted to accommodate the ends of a handle 39 which extend through the main frame and by means of which the machine is handled, set screws 40 being provided in the bosses for securing the ends of the handle in position, and it will be obvious that when a downward pressure is exerted on the handle, that the sub-frame will be forced downwardly on the pins 18 until the wheel 30 comes into contact with and rides on the face of the linoleum, the rotating cutting members 33 being forced into the linoleum "B", the depth of cut being gauged by means of the eccentric 29 which is mounted on the shaft 26.

Inasmuch as linoleum is laid in rooms of various widths and lengths, the track 14 is made up in sections, this is preferably channel shaped in cross section, the ends 41 of the sections being formed as clearly shown in Fig. 7 of the drawings, the track being cut transversely to about the center thereof, thence longitudinally, and thence transversely, consequently, the joints will be staggered and the double grooved rollers will travel thereover without jarring or effecting the alignment of the unit with relation to the track.

The track when laid must remain in set position and we, therefore, provide spaced apart openings 42 in the web thereof, and a resilient bowed strip 43 is secured to the web by means of screws 44, vacuum cups 45 being provided on the opposite ends of the strip, and when forced into contact with the surface of the linoleum will firmly hold the track in position, although it may be necessary to slightly dampen the surface of the linoleum beneath the vacuum cups to seal any pores which might otherwise admit air to the cups.

In practise and when desiring to insert a feature strip 46 as shown in Fig. 9 of the drawings, the track is first placed in proper position with the necessary sections in end to end relation, the cutting machine is then placed on the track with the groooved rollers engaging the channel legs, the eccentric 29 is then adjusted so that the saws will cut to the desired depth, then when the operator presses down on the handle 39 the motor will be energized and the entire sub-frame forced downwardly, the wheel 30 will contact and ride on the face of the linoleum with the saws 33 accurately cutting the linoleum to the desired depth, the operator then pushes the machine along on the track, making a smooth, accurate and clean cut. When the machine reaches a corner or end of the cut, a very slight uncut portion remains, and this is readily severed by the usual knife (not shown). The cut strip is then removed and the feature strip 46 inserted in position.

To protect the mechanism from dust and cuttings, we provide a shield 47, and this can be secured in position by means of clips 48 or the like, the front end of the shield being curved as shown at 49 and serves to deflect the cuttings outwardly and away from the cutting line.

The device readily accommodates itself to uneven or rough floors, the sub-frame moving vertically to suit any variations, while the main frame remains in proper alignment on the track. One or more cutting elements can be used and the spacing is governed by providing separators of various lengths. The track is readily laid, and the vacuum cups easily secure it in position as there is no side pressure on the track.

From the foregoing description, it will be obvious that we have perfected a very simple, practical and convenient cutting machine for use in laying linoleum borders, feature strips and in matching strips of material where the edges must be accurate and true.

What we claim is:

1. A linoleum cutting machine of the class described and comprising a mobile frame adapted for travel on a track, revolvable saws mounted on said frame (in spaced parallel relation to cut a strip, means for vertically adjusting said saws with relation to the frame, and means for driving said saws.

2. A cutting machine of the class described and comprising a wheeled carriage adapted for travel on a raised track and on the material to be cut, a sub-frame connected with the carriage and movable with relation thereto, saws carried by the sub-frame, adjustable means on said sub-frame for limiting the downward movement thereof, and a motor drivingly connected to said saws.

3. A cutting machine of the class described comprising a main frame, a sub-frame carried thereby and movable vertically with relation thereto, saws mounted on the sub-frame, adjustable floor engaging means mounted on the sub-frame for regulating the depth of cut of the saws and means for driving said saws.

4. A cutting machine of the class described and comprising a wheeled track engaging main frame, a sub-frame mounted on and movable vertically with relation thereto, saws carried by the sub-frame and arranged in spaced parallel relation to cut a strip, and driving means mounted on the main frame and drivingly connected to said saws.

5. A material cutting machine of the class described and comprising a wheeled frame, a sub-frame carried by the main frame and movable vertically with relation thereto, cutting elements journaled on the sub-frame, a floor engaging wheel mounted on said sub-frame, means for adjusting said wheel to regulate the depth of cut of the cutting elements, and means for driving said cutting elements.

6. A material cutting machine of the class described and comprising a wheeled frame adapted for travel on a track, transversely spaced apart spring retracted cutting element assembly mounted on said frame, means for vertically adjusting said assembly to regulate the depth of cut, and means for driving said cutting elements.

7. A material cutting machine comprising a wheeled main frame adapted for travel on a track, a sub-frame carried by the main frame, transversely adjustable cutting elements carried by the sub-frame, a guage wheel on said sub-frame, means for adjusting said gauge wheel with relation to said cutting elements, and means for driving said cutting elements.

8. A material cutting machine of the class described and comprising a mobile main frame adapted for travel on a track, a pressure actuated sub-frame slidably connected to the main frame and movable vertically with relation thereto, cutting elements carried by the sub-frame, a gauge means on the sub-frame for regulating the depth of cut of said cutting elements, means for driving said cutting elements, and means for drawing said sub-frame back to original position when the pressure is removed.

9. A material cutting machine of the class described and comprising a wheeled main frame adapted for travel on a track, an underslung sub-frame connected to the main frame and movable vertically with relation thereto, when pressure is exerted thereon, a handle cutting members carried by the sub-frame, adjustable means mounted on the sub-frame and adjustable with relation to the cutting members to regulate the depth of cut of the cutting members, and means for driving said cutting members and means for drawing said sub-frame to original raised position when the pressure is removed.

10. A material cutting machine of the class described and comprising a wheeled carriage adapted for travel on a track, an underslung sub-frame carried by the carriage and vertically movable with relation thereto, cutting elements mounted on the sub-frame, a material engaging member mounted on the sub-frame and adjustable with relation thereto for regulating the depth of cut, and means for driving said cutting elements.

11. A linoleum cutting machine of the class described comprising a mobile main frame adapted for travel on a track, pilots on the under face of the main frame, a sub-frame mounted on and vertically movable on said pilots, a shaft journaled in the sub-frame, cutting members mounted on said shaft, an adjustable eccentric including a wheel mounted on said shaft for adjusting the cutting elements with relation to said wheel, resilient means normally tending to draw the sub-frame toward the main frame, and means for driving said shaft.

12. A linoleum cutting machine of the class described and comprising a main frame provided with wheels adapted for travel on a track, a floor engaging wheel spaced from the track, a vertically movable sub-frame mounted on the main frame, cutting members mounted thereon, a handle on the sub-frame for exerting pressure on the sub-frame to force the cutting members into the linoleum, an adjustable eccentric roller mounted on the sub-frame directly adjacent the cutting members, and means mounted on the main frame for driving said cutting members.

13. The combination with a sectional track, of a cutting machine mounted for travel thereon, and comprising a wheeled frame, revolvable saws mounted on said frame in spaced parallel relation to cut a strip, means for vertically adjusting said saws with relation to the frame, and means for driving said saws.

HAROLD G. MARION.
CHRISTIAN F. REER.